(12) United States Patent
Hills et al.

(10) Patent No.: US 11,840,481 B2
(45) Date of Patent: Dec. 12, 2023

(54) PRODUCTION OF AGGREGATES

(71) Applicant: CARBON8 SYSTEMS LIMITED, Aylesford (GB)

(72) Inventors: Colin Hills, Whitstable (GB); Paula Carey, Hadlow (GB)

(73) Assignee: CARBON8 SYSTEMS LIMITED, Aylesford (GB)

( * ) Notice: Subject to any disclaimer, the term of this patent is extended or adjusted under 35 U.S.C. 154(b) by 0 days.

(21) Appl. No.: 16/098,360

(22) PCT Filed: May 11, 2017

(86) PCT No.: PCT/GB2017/051319
§ 371 (c)(1),
(2) Date: Nov. 1, 2018

(87) PCT Pub. No.: WO2017/194953
PCT Pub. Date: Nov. 16, 2017

(65) Prior Publication Data
US 2019/0119158 A1 Apr. 25, 2019

(30) Foreign Application Priority Data
May 11, 2016 (GB) ..................... 1608268

(51) Int. Cl.
*C04B 18/02* (2006.01)
*C04B 18/14* (2006.01)
(Continued)

(52) U.S. Cl.
CPC ........ *C04B 18/021* (2013.01); *C04B 18/0481* (2013.01); *C04B 18/06* (2013.01);
(Continued)

(58) Field of Classification Search
CPC ... C04B 18/021; C04B 18/142; C04B 18/087; C04B 40/0071; C04B 40/0231;
(Continued)

(56) References Cited

U.S. PATENT DOCUMENTS

| 4,744,829 A | 5/1988 | Eirich |
| 10,343,199 B2 * | 7/2019 | Hills ..................... B09C 1/08 |

(Continued)

FOREIGN PATENT DOCUMENTS

| JP | S6046955 A | 3/1985 |
| JP | 2002160952 A | 6/2002 |

(Continued)

OTHER PUBLICATIONS

Viridor to recycle incinerator residues (Year: 2015).*

(Continued)

*Primary Examiner* — Shuangyi Abu Ali
(74) *Attorney, Agent, or Firm* — Schwabe, Williamson & Wyatt, PC

(57) ABSTRACT

An improved process for the preparation of aggregates for use with mixtures of various carbonatable substances, in particular mixtures comprising pulverised fuel ash and/or steel slag. The mixtures also comprise a carbonatable binder. The process comprises the steps of a. blending a combination of two carbonatable wastes, b. mixing the blended carbonatable waste with a carbonatable binder, c. mixing the blended carbonatable waste and binder with water, and d. carbonating the damp blended carbonatable waste in the presence of carbon dioxide.

8 Claims, 5 Drawing Sheets

(51) Int. Cl.
*C04B 18/06* (2006.01)
*C04B 18/04* (2006.01)
*C04B 20/02* (2006.01)
*C04B 28/04* (2006.01)

(52) U.S. Cl.
CPC .......... *C04B 18/142* (2013.01); *C04B 20/023* (2013.01); *C04B 28/04* (2013.01); *Y02W 30/91* (2015.05)

(58) Field of Classification Search
CPC ....... C04B 7/02; C04B 18/101; C04B 18/162; C04B 18/0481; C04B 18/06; C04B 20/023; C04B 28/04; Y02W 30/92; Y02W 30/94; Y02W 30/95; Y02W 30/91
See application file for complete search history.

(56) References Cited

U.S. PATENT DOCUMENTS

| | | |
|---|---|---|
| 2006/0189837 A1 | 8/2006 | Forrester |
| 2009/0104349 A1* | 4/2009 | Hills ................... B09B 3/0041 427/242 |
| 2018/0112360 A1* | 4/2018 | Skerfe ................... D21H 17/70 |

FOREIGN PATENT DOCUMENTS

| | | |
|---|---|---|
| SU | 1286560 A | 1/1987 |
| WO | 2007/096671 A1 | 8/2007 |
| WO | 2017/194953 A1 | 11/2017 |

OTHER PUBLICATIONS

Carbon negative: First commercial application of accelerated carbonation technology to Gunning et al. (Year: 2014).*
Accelerated carbonation of municipal solid waste incineration fly ashes to li et al. Waste Management vol. 27, Issue 9, 2007, pp. 1200-1206 (Year: 2007).*
Patent Cooperation Treaty: International Search Report and Written Opinion for PCT/GB2017/051319 dated Sep. 15, 2017; 10 pages.
letsrecycle.com "Innovative APCr recycling plant to go live", Jan. 16, 2012, XP002773224, retrieved from the Internet at URL: <http://www.letsrecycle.com/news/latest-news/innovative-apcr-recycling-plant-to-go-live/>; retrieved on Aug. 25, 2017; 2 pages.
Intellectual Property Office: Search Report under Section 17(5) for GB Application No. 1608268.7 dated Jan. 5, 2017; 6 pages.
Gunning et al., Waste Management, "Production of lightweight aggregate from industrial waste and carbon dioxide", vol. 29, issue 10 (Oct. 2009); pp. 2722-2728. See the 'Materials and Methods' section at pp. 2723 to 2724.

* cited by examiner

| Carbonatable Waste | Source | Location of Source |
|---|---|---|
| Air Pollution Control Residue | Municipal Waste Solid Incineration | Northern England, UK |
| Steel Slag | Steel Production | Northern England, UK |
| Cement Bypass Dust | Cement Production | England Midlands, UK |
| Biomass Ash | Power Generation | Picardie, France |
| Pulverised Fuel Ash | Coal Fired Power Station | Nova Scotia, Canada |
| Portland Cement | Cemex Ltd. | |

FIGURE 4

| Carbonatable Waste | $Al_2O_3$ | CaO | $Fe_2O_3$ | MgO | $P_2O_5$ | $K_2O$ | $SiO_2$ | $SO_3$ | $Na_2O$ | $TiO_2$ | Cl | Others |
|---|---|---|---|---|---|---|---|---|---|---|---|---|
| Air Pollution Control Residue | 0.51 | 32.34 | 0.35 | 0.4 | 0.27 | 0.39 | 1.96 | 8.24 | 8.51 | 0.34 | 26.54 | 20.15 |
| Steel Slag | 0.98 | 44.16 | 0.33 | 3.96 | - | - | 17.75 | 0.97 | - | 0.27 | - | 31.58 |
| Cement Bypass Dust | 1.96 | 43.3 | 2.18 | 0.32 | 0.22 | 4.5 | 7.5 | 17.1 | 0.45 | 0.23 | 0.9 | 21.34 |
| Biomass Ash | 0.6 | 52.4 | 1.3 | 2.21 | 2.3 | 10.61 | 2.71 | 6 | 0.14 | 0.07 | 0.48 | 21.25 |
| Pulverised Fuel Ash | 3.48 | 38.32 | 5.28 | 0.37 | - | 0.79 | 7.52 | 18.29 | - | - | 0.14 | 25.81 |
| Portland Cement | 2.66 | 54.79 | 2.94 | 0.69 | 0.1 | 0.8 | 12.8 | 3.79 | 0.22 | 0.18 | 0.04 | 21.29 |

FIGURE 5

| Carbonatable Waste | Carbonation Time (mins) | Strength (MPa) |
|---|---|---|
| Portland Cement | 10 | 1.215 |
| Air Pollution Control Residue | 10 | 0.802 |
| Biomass Ash | 10 | 0.61 |
| Cement Bypass Dust | 10 | 2.237 |
| Steel Slag | 10 | 2.312 |
| Pulverised Fuel Ash | 10 | 1.94 |

FIGURE 6

| Carbonatable Waste | Carbonation Time (mins) | Strength (MPa) |
|---|---|---|
| Portland Cement | 20 | 1.959 |
| Air Pollution Control Residue | 20 | 1.045 |
| Biomass Ash | 20 | 1.301 |
| Cement Bypass Dust | 20 | 3.311 |
| Steel Slag | 20 | 2.851 |
| Pulverised Fuel Ash | 20 | 3.196 |

FIGURE 7

PRODUCTION OF AGGREGATES

CROSS-REFERENCE TO RELATED APPLICATION

The present application is a national phase entry under 35 U.S.C. § 371 of International Application No. PCT/GB2017/051319, filed May 11, 2017, which designates the United States of America, which claims priority to GB Application No. 1608268.7, filed May 11, 2016, the entire disclosures of each of these applications are hereby incorporated by reference in their entireties and for all purposes.

TECHNICAL FIELD OF THE INVENTION

The present invention relates to the production of aggregates comprising air pollution control residue with a carbonatable substance. The present invention also relates to the production of aggregates comprising portland cement and air pollution control residue, cement bypass dust or biomass ash. The present invention also relates to the production of aggregates comprising two or more carbonatable wastes.

BACKGROUND TO THE INVENTION

Primary aggregates for use in concrete mixtures are produced from naturally formed rocks, stones and gravels.

Due to the limited and increasingly costly supply of primary aggregates, research has been carried out into the production of secondary aggregates for replacing or supplementing primary aggregates in concrete mixtures.

Embodiments of the present invention seek to provide an improved process for the preparation of aggregates, in particular secondary aggregates.

SUMMARY OF THE INVENTION

According to a first aspect of the present invention, there is provided a process for the preparation of aggregates, the process comprising the steps of:
  a. blending air pollution control residue with a carbonatable substance;
  b. mixing the blended air pollution control residue and carbonatable substance with water to form a damp blended air pollution control residue and carbonatable substance mixture; and
  c. carbonating the damp blended air pollution control residue and carbonatable substance mixture in the presence of carbon dioxide.

In this way, the first aspect of the present invention provides a process for the production of secondary aggregates comprising a combination of air pollution control residue, which is typically recovered from incineration of municipal waste, and a carbonatable (i.e. carbon dioxide reactive) substance. Such a combination provides a significant increase in the rate of hardening of the aggregate during carbonation, which enables the aggregate to be formed much more quickly than conventional secondary aggregates.

The carbonatable substance may be cement bypass dust, biomass ash or ordinary portland cement.

The process may further comprise the step of initially sieving or filtering or separating the carbonatable substance and/or the air pollution control residue before they are blended together. The carbonatable substance and/or the air pollution control residue may be initially sieved, filtered or separated to obtain an average particle size of less than around 0.1 mm, in particular around 0.05 mm to 0.1 mm.

The air pollution control residue and carbonatable substance may be blended in a vessel. The vessel may be a beaker. The vessel or beaker may have a volume of around 25 ml. The air pollution control residue and carbonatable substance may be blended by hand or may be blended by a machine such as a planetary mixer.

The weight ratio between the air pollution control residue and the carbonatable substance may be approximately 1:2 or approximately 2:1. Preferably, the weight ratio may be approximately 1:1.5 or approximately 1.5:1. More preferably, the weight ratio may be approximately 1:1.

The blended air pollution control residue and carbonatable substance may be mixed with around 15-30% w/w of water, alternatively around 15-25% w/w of water, or alternatively around 20-30% w/w of water, or around 25% w/w of water, to form the damp blended air pollution control residue and carbonatable substance mixture.

The process may further comprise the step of mixing the damp blended air pollution control residue and carbonatable substance mixture after its mixing with water. The damp blended air pollution control residue and carbonatable substance mixture may be mixed by hand or may be mixed by a machine such as a planetary mixer. In this way, a second stage of mixing may ensure that water is spread evenly throughout the mixture.

The process may further comprise the step of sieving the damp blended air pollution control residue and carbonatable substance mixture. The damp blended air pollution control residue and carbonatable substance mixture may be sieved to obtain an average particle size of around 0.05 mm to 0.15 mm, in particular an average particle size of around 0.1 mm or less than 0.1 mm.

According to a second aspect of the present invention, there is provided a process for the preparation of aggregates, the process comprising the steps of:
  a. blending portland cement with a carbonatable substance;
  b. mixing the blended portland cement and carbonatable substance with water to form a damp blended cement and carbonatable substance mixture; and
  c. carbonating the damp blended portland cement and carbonatable substance mixture in the presence of carbon dioxide,
  wherein the carbonatable substance is air pollution control residue, cement bypass dust, biomass ash or steel slag.

In this way, the second aspect of the present invention provides a process for the production of secondary aggregates comprising a combination of portland cement and either air pollution control residue, cement bypass dust or biomass ash, which are carbonatable (i.e. carbon dioxide reactive) substances. Such a combination provides a significant increase in the rate of hardening of the aggregate during carbonation, which enables the aggregate to be formed much more quickly than conventional secondary aggregates.

The process may further comprise the step of initially sieving or filtering or separating the carbonatable substance and/or the portland cement before they are blended together. The carbonatable substance and/or the portland cement may be initially sieved, filtered or separated to obtain an average particle size of less than around 0.1 mm, in particular around 0.05 mm to 0.1 mm.

The portland cement and carbonatable substance may be blended in a vessel. The vessel may be a beaker. The vessel or beaker may have a volume of around 25 ml. The air pollution control residue and carbonatable substance may be blended by hand or may be blended by a machine such as a planetary mixer.

The weight ratio between the portland cement and the carbonatable substance may be approximately 1:2 or approximately 2:1. Preferably, the weight ratio may be approximately 1:1.5 or approximately 1.5:1. More preferably, the weight ratio may be approximately 1:1.

The blended portland cement and carbonatable substance may be mixed with around 25% w/w of water to form the damp blended portland cement and carbonatable substance mixture.

The process may further comprise the step of mixing the damp blended portland cement and carbonatable substance mixture after its mixing with water. The damp blended portland cement and carbonatable substance mixture may be mixed by hand or may be mixed by a machine such as a planetary mixer. In this way, a second stage of mixing may ensure that water is spread evenly throughout the mixture.

The process may further comprise the step of sieving the damp blended portland cement and carbonatable substance mixture. The damp blended portland cement and carbonatable substance mixture may be sieved to obtain an average particle size of around 0.05 mm to 0.15 mm, in particular an average particle size of around 0.1 mm or less than 0.1 mm.

According to a third aspect of the present invention, there is provided a process for the preparation of aggregates, the process comprising the steps of:
a. blending a first carbonatable waste with a second carbonatable waste to form a blended carbonatable waste;
b. mixing the blended carbonatable waste with water to form a damp blended carbonatable waste mixture; and
c. carbonating the damp blended carbonatable waste in the presence of carbon dioxide.

In this way, the third aspect of the present invention provides a process for the production of secondary aggregates comprising a combination of at least two different carbonatable (i.e. carbon dioxide reactive) wastes. Such a combination of carbonatable wastes provides a significant increase in the rate of hardening of the aggregate during carbonation, which enables the aggregate to be formed much more quickly than conventional secondary aggregates.

The first carbonatable waste may be air pollution control residue cement bypass dust, biomass ash or ordinary portland cement. The ordinary portland cement may be out-dated ordinary portland cement.

The second carbonatable waste may be air pollution control residue cement bypass dust, biomass ash or ordinary portland cement. The ordinary portland cement may be out-dated ordinary portland cement.

The process may further comprise the step of initially sieving or filtering or separating the first carbonatable waste and/or the second carbonatable waste before they are blended together. The first carbonatable waste and/or the second carbonatable waste may be initially sieved, filtered or separated to obtain an average particle size of less than around 0.1 mm, in particular around 0.05 mm to 0.1 mm.

The process may further comprise the step of mixing the blended carbonatable waste with a carbonatable binder. The carbonatable binder may be cement kiln dust or ordinary portland cement.

The process may further comprise the step of initially sieving or filtering or separating the carbonatable binder before blending with the first and second carbonatable wastes. The carbonatable binder may be sieved or filtered or separated to obtain a carbonatable binder having an average particle size of less than around 0.1 mm, in particular around 0.05 mm to 0.1 mm.

When the blended carbonatable waste comprises a carbonatable binder, the first carbonatable waste may be steel slag or pulverised fuel ash and/or the second carbonatable waste may be steel slag or pulverised fuel ash.

The blended carbonatable waste may be blended in a vessel. The vessel may be a beaker. The vessel or beaker may have a volume of around 25 ml. The carbonatable wastes may be blended by hand or may be blended by a machine such as a planetary mixer.

When the blend or mixture comprises only a first carbonatable waste and a second carbonatable waste, the weight ratio between the first carbonatable waste and the second carbonatable waste may be approximately 1:2 or approximately 2:1. Preferably, the weight ratio may be approximately 1:1.5 or approximately 1.5:1. More preferably, the weight ratio may be approximately 1:1. When the blend comprises a first carbonatable waste, a second carbonatable waste and a carbonatable binder, the weight ratio between the first carbonatable waste, second carbonatable waste and carbonatable binder may be approximately 1:2:2 or approximately 2:1:2. Preferably, the weight ratio may be approximately 1:1.5:2 or approximately 1.5:1:2. More preferably, the weight ratio may be approximately 1:1:2.

The process may further comprise a step of mixing the blended carbonatable waste with a third carbonatable waste. The third carbonatable waste may be pulverised fuel ash or steel slag.

The blended carbonatable waste may be mixed with around 25% w/w of water to form the damp blended carbonatable waste mixture. In particular, around 2.5 grams of water may be used. The water may be deionised water.

The process may further comprise the step of mixing the damp blended carbonatable waste mixture after its mixing with water. The damp blended carbonatable waste mixture may be mixed by hand or may be mixed by a machine such as a planetary mixer. In this way, a second stage of mixing may ensure that water is spread evenly throughout the mixture.

The process may further comprise the step of sieving the damp blended carbonatable waste mixture. The damp blended carbonatable waste may be sieved to obtain an average particle size of around 0.05 mm to 0.15 mm, in particular an average particle size of around 0.1 mm or less than 0.1 mm.

The process of the first, second and/or third aspect of the invention may further comprise a step of pressing the damp blended air pollution control residue and carbonatable substance mixture or damp blended portland cement and carbonatable substance mixture or carbonatable waste mixture into a form or shape that resembles the shape of aggregate used in concrete. The damp blended mixture may be pressed into pellet form. The pressing step may occur before the carbonation step. This pressing step may occur after the blending step. The pellet form may be substantially cylindrical or substantially spherical. The mixture may be pressed into a pellet form or shape by using a pellet press. In this way, the mixture is pressed into its final shape before carbonation, whilst it is still mouldable.

The process of the first, second and/or third aspect of the invention may comprise a step of tumbling the damp blended air pollution control residue and carbonatable substance mixture or damp blended portland cement and carbonatable substance mixture or damp blended carbonatable waste mixture. A tumbling process which may be employed is described in WO 2007/096671 A1. The tumbling may take place in the presence of carbon dioxide so that the carbonation step and the tumbling step take place concurrently. The damp blended mixture may be extruded. An extrusion process applying a force of between 50-100 N, alternatively less than 50 N, or alternatively more than 100 N, may be used. The pellet press may comprise a split mould. The split mould may be manufactured from nylon. The split mould may be around 30 mm×10 mm. The split mould may have an aperture of around 8 mm for enabling removal of the pressed pellets.

The pellet press may comprise a plunger. The plunger may be manufactured from cast resin. The plunger may be around 32 mm×7.5 mm.

The pellet press may comprise a retaining collar. The retaining collar may be reinforced. The retaining collar may be manufactured from nylon. The retaining collar may be around 230 mm×160 mm. The retaining collar may have an aperture of around 100 mm.

A force of around 50-150 N may be used to cast each pellet in the pellet press. Preferably, a force of around 100 N may be used to cast each pellet in the pellet press.

Each pellet of the damp carbonatable waste mixture may be formed from a mixture of approximately 2.5 grams of a first carbonatable waste, approximately 2.5 grams of a second carbonatable waste and approximately 5 grams of a carbonatable binder. Alternatively, each pellet may be formed from a mixture of approximately 5 grams of a first carbonatable waste and approximately 5 grams of a second carbonatable waste. Thus, each pellet may be formed from approximately 10 grams of dry material.

The damp blended air pollution control residue and carbonatable substance mixture or damp blended portland cement and carbonatable substance mixture or carbonatable waste mixture may be carbonated in a carbon dioxide-rich gaseous environment. That is, the carbonation may be carried out in an atmosphere that has a carbon dioxide content greater than that of natural air. For example, the carbonation may be carried out in an atmosphere containing at least 50%, 60%, 70% or 80% carbon dioxide by volume. Preferably, the atmosphere may consist mostly of carbon dioxide, for example 90%, 85% or 99% by volume. The carbonation may take place in a carbonation chamber. The carbonation chamber may be fully or partially enclosed, for example the carbonation chamber may be a pan pelletiser. The carbonation chamber may have a volume of approximately 5 litres. The pressure in the carbonation chamber may be atmospheric pressure. Alternatively, the pressure in the carbonation chamber may be slightly above atmospheric pressure. For example, the pressure in the carbonation chamber may be around 2 bar. This ensures that sufficient carbon dioxide is available to maximise or complete carbonation, without unduly impacting on strength development.

The blended mixtures of the first, second and/or third aspects of the invention may comprise any number of additional carbonatable substances or wastes blended into the mixture. For example, a third carbonatable substance or waste may be included in the blended mixture. The third carbonatable substance or waste may be steel slag or pulverised fuel ash. Alternatively, the third carbonatable substance or waste may be air pollution control residue, cement bypass dust or biomass ash.

DETAILED DESCRIPTION OF THE INVENTION

In order that the invention may be more clearly understood an embodiment thereof will now be described, by way of example only, with reference to the accompanying drawings, of which:

FIG. 4 is a table showing the sources of various carbonatable wastes that are described herein;

FIG. 5 is a table showing the % weight compositions of various carbonatable wastes that are described herein.

Figure 1:
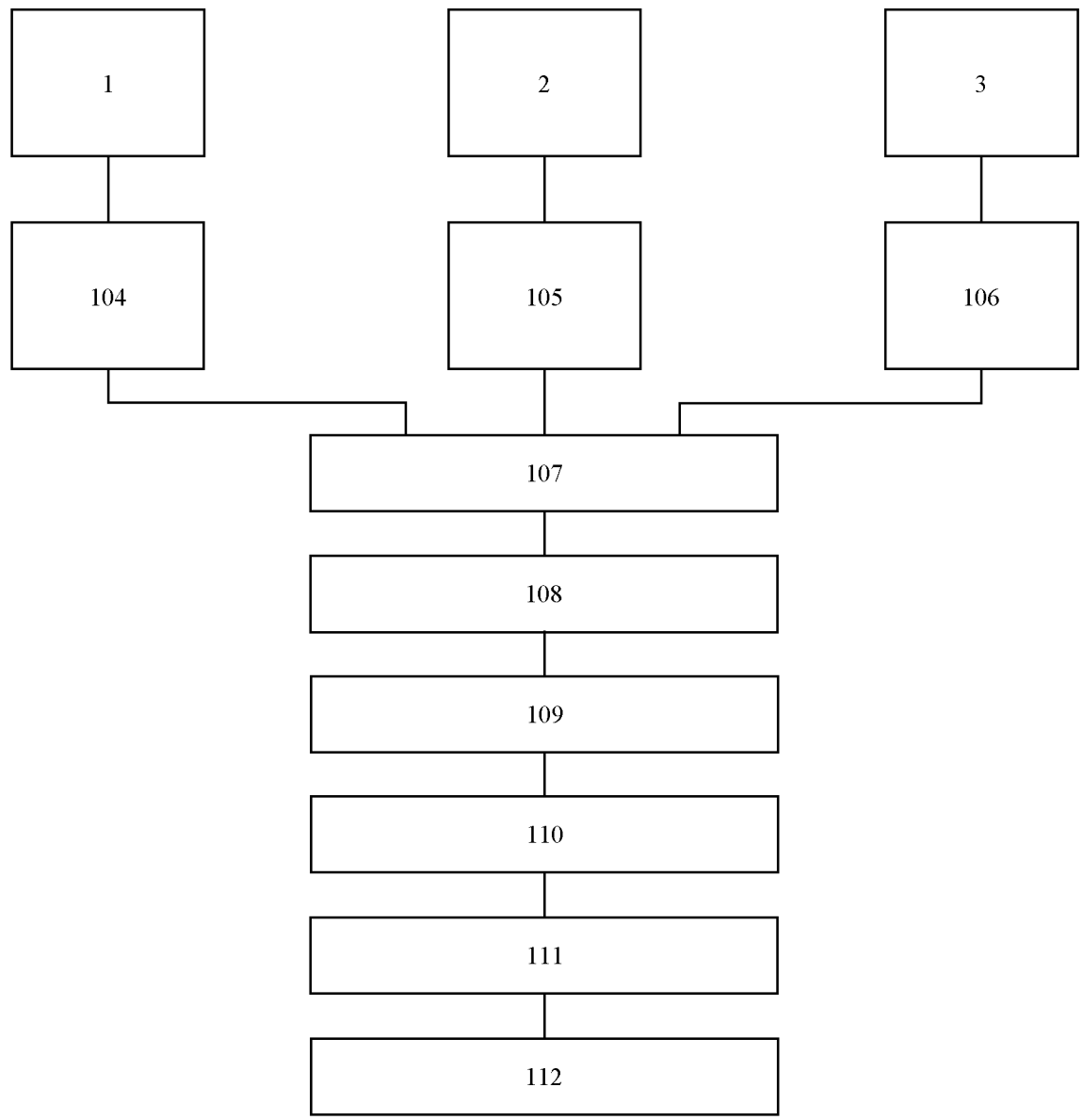
FIG. 1 is a schematic block diagram of a process according to an embodiment of the present invention.

FIG. 6 is a table showing the strength of pellets of individual carbonatable wastes produced by the process shown in FIG. 1, with no second carbonatable waste and no carbonatable binder, with a carbonation time of 10 minutes; and FIG. 7 is a table showing the strength of pellets of individual carbonatable wastes produced by the process shown in FIG. 1, with no second carbonatable waste and no carbonatable binder, with a carbonation time of 20 minutes.

Referring to FIG. 1, a first carbonatable waste 1 and a second carbonatable waste 2 are initially selected. In this embodiment, the first carbonatable waste 1 is cement bypass dust from cement production in the Midlands, UK, and the second carbonatable waste is biomass ash from biomass power generation in Picardie, France. The sources of the first and second carbonatable wastes 1, 2, are shown in FIG. 4. The compositions of the first and second carbonatable wastes 1, 2 are shown in FIG. 5.

A carbonatable binder 3 is then selected. In this embodiment, the carbonatable binder is ordinary portland cement (52.5 N), supplied by Cemex® Ltd. The composition of the carbonatable binder 3 is shown in FIG. 4.

At step 104, approximately 2.5 grams of the first carbonatable waste 1 is sieved to obtain a particle size of less than 0.1 mm.

At step 105, approximately 2.5 grams of the second carbonatable waste 2 is sieved to obtain a particle size of less than 0.1 mm.

At step 106, approximately 5 grams of the carbonatable binder is sieved to obtain a particle size of less than 0.1 mm.

At step 107, the sieved first carbonatable waste 1, second carbonatable waste 2 and carbonatable binder 3 are combined into a 25 ml beaker and the mixture is thoroughly blended by hand to ensure homogeneity. The dry mixture thus weighs 10 grams.

At step 108, the blended carbonatable wastes 1, 2 and carbonatable binder 3 mixture is wetted with 2.5 grams (25% w/w) of deionised water using a dropping pipette.

At step 109, the damp blended carbonatable wastes 1, 2 and carbonatable binder 3 mixture is hand mixed for a second time to ensure that the water in the mixture is evenly distributed. The mixture is then sieved to ensure a particle size of less than 0.1 mm.

At step 110, the damp blended carbonatable wastes 1, 2 and carbonatable binder 3 mixture is pressed into pellet form using a customised pellet press. The pellet press comprises a 30 mm×10 mm nylon split mould with an 8 mm aperture to enable removal of pressed samples; a 32 mm×7.5 mm cast resin plunger and a 230 mm×160 mm reinforced nylon retaining collar with an aperture of 100 mm.

In use of the pellet press during step 110, the nylon split mould is inserted into the reinforced nylon retaining collar and placed onto a clean stainless steel dish. The damp mixture of blended carbonatable wastes 1, 2 and a carbonatable binder 3 is carefully placed into the nylon split mould and the cast resin plunger is readied into position. A load of approximately 100 N is applied to the resin plunger to cast the pellet, measured by a Mecmesin® BFG500 N force gauge, to an accuracy of ±0.1 N. The resin plunger is then removed carefully by hand and the nylon mould is removed from the reinforced nylon retaining collar. The nylon mould is split open using a spatula so that the pressed pellet can be removed for the mould. Five cylindrical pellets are typically produced for each mixture of blended carbonatable wastes 1, 2 and carbonatable binder 3.

At step 111, the pellets of blended carbonatable wastes 1, 2 and carbonatable binder 3 are transferred to a five litre carbonation chamber containing carbon dioxide, where they begin to carbonate and harden/set. The chamber operates at a pressure of 2 bar, which is slightly above atmospheric pressure to ensure that a sufficient supply of carbon dioxide is available for carbonation of the pellets, but is not so high as to unduly impact on strength development.

At step 112, after a period of 10 minutes, the pellets are removed from the chamber. The dimensions of each pellet are measured using a Mitutoyo® CD-6 CP measuring calipers, to an accuracy of ±0.01 mm. Each pellet has a diameter of approximately 7.7 mm and thus a radius of approximately 3.85 mm. The length ratio of each pellet is around 1.0 and thus the length of each pellet is around 7.7 mm.

Each pellet is then destructively tested to determine its compressive strength. Each pellet is placed beneath a force gauge and load is applied to the force gauge until the pellet fails under compression. A Mecmesin® BFG500 N force gauge was used, to an accuracy of ±0.1 N.

The above embodiment is described by way of example only. Many variations are possible without departing from the scope of the invention as defined in the appended claims.

EXAMPLES

FIG. 4 shows the sources of the carbonatable wastes discussed below and FIG. 5 shows the compositions of the carbonatable wastes shown in FIG. 4.

The examples described below were formed using the process as described in the Detailed Description of the Invention, except that in some examples there was no carbonatable binder added to the blend of carbonatable wastes. Five samples of each combination of carbonatable wastes were formed and carbonated in the carbonation chamber for a period of either 10 minutes or 20 minutes. Each cylindrical sample had a diameter of approximately 7.7 mm (thus a radius of 3.85 mm) and a length of approximately 7.7 mm.

The compressive strength in Newtons of each sample was determined by using a Mecmesin® BFG500 N force gauge in the manner as described in the Detailed Description of the Invention. The strength in MPa was determined by the following formula:

$$\text{Strength}(MPa) = \frac{\text{Strength}(N)}{\pi r^2}$$

FIGS. 6 and 7 show the average strength in MPa of five samples of each individual carbonatable waste. These reference samples were all prepared using the process described above in the Detailed Description of the Invention, except that there no second carbonatable waste and no carbonatable binder were added to the blend.

Figure 2:
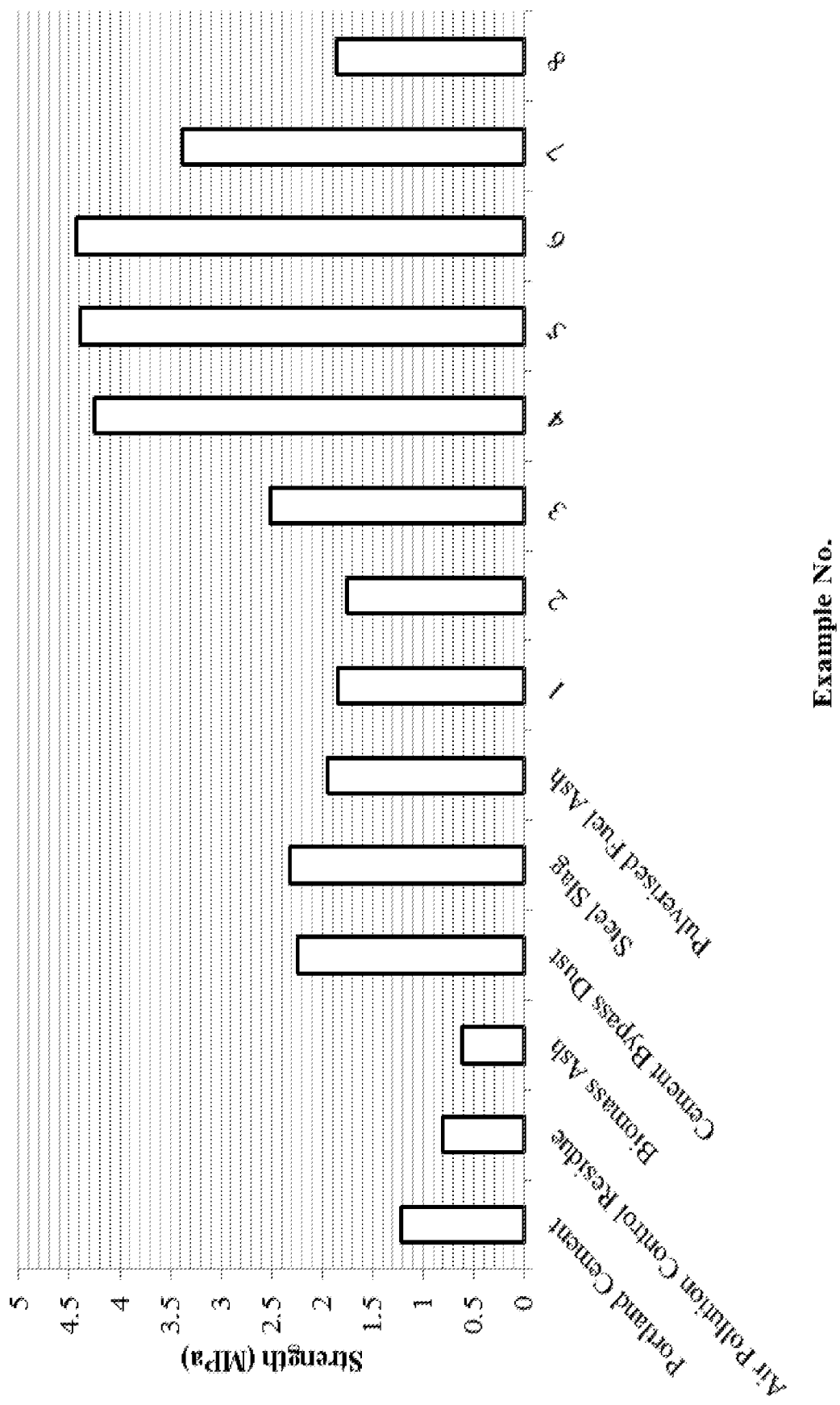
FIG. 2 is a graph showing the strength of carbonatable wastes and combinations of carbonatable wastes produced by the process shown in FIG. 1, with a carbonation time of 10 minutes.
Figure 3:
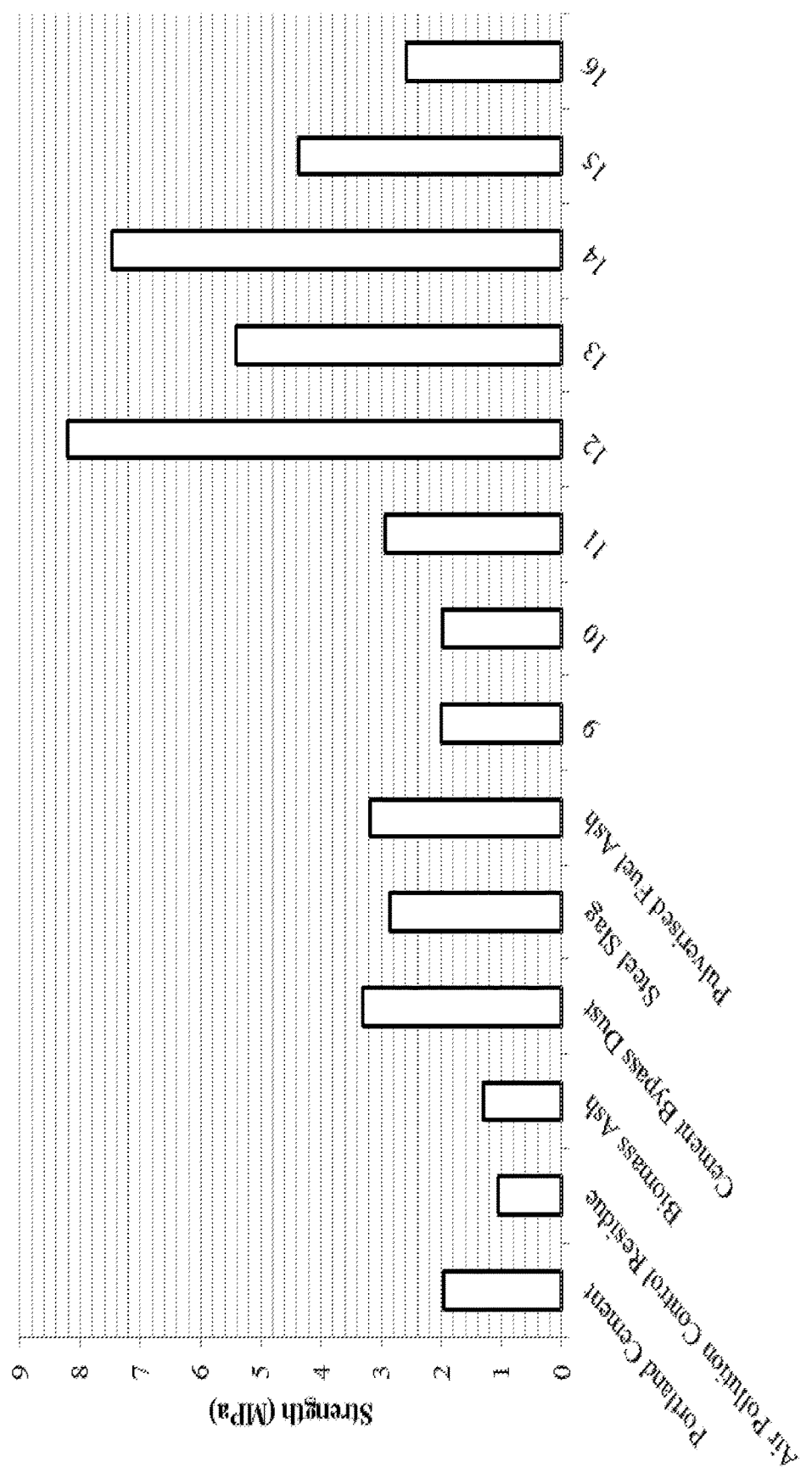
FIG. 3 is a graph showing the strength of carbonatable wastes and combinations of carbonatable wastes produced by the process shown in FIG. 1, with a carbonation time of 20 minutes.

FIGS. 2 and 3 show the average strength in MPa of five samples of each example composition described below, together with the average strength of five samples of each individual carbonatable waste. As can be seen, after carbonating for a given period of time (10 minutes or 20 minutes) the aggregate comprising a combination of carbonatable wastes is typically stronger than the aggregate comprising only ordinary portland cement or the aggregate comprising only a single carbonatable waste.

Example 1

First Carbonatable Waste: 5 g Air Pollution Control Residue
Second Carbonatable Waste: 5 g Biomass Ash
Carbonatable Binder: NONE
Carbonation Time: 10 mins
Strength: 1.842 MPa Example 2

First Carbonatable Waste: 5 g Cement Bypass Dust
Second Carbonatable Waste: 5 g Biomass Ash
Carbonatable Binder: NONE
Carbonation Time: 10 mins
Strength: 1.748 MPa Example 3

First Carbonatable Waste: 5 g Biomass Ash
Second Carbonatable Waste: NONE
Carbonatable Binder: 5 g Portland Cement
Carbonation Time: 10 mins
Strength: 2.503 MPa Example 4

First Carbonatable Waste: 5 g Cement Bypass Dust
Second Carbonatable Waste: NONE
Carbonatable Binder: 5 g Portland Cement
Carbonation Time: 10 mins
Strength: 4.255 MPa Example 5

First Carbonatable Waste: 2.5 g Cement Bypass Dust
Second Carbonatable Waste: 2.5 g Biomass Ash
Carbonatable Binder: 5 g Portland Cement
Carbonation Time: 10 mins
Strength: 4.397 MPa Example 6

First Carbonatable Waste: 2.5 g Pulverised Fuel Ash
Second Carbonatable Waste: 2.5 g Steel Slag
Carbonatable Binder: 5 g Portland Cement
Carbonation Time: 10 mins
Strength: 4.427 MPa Example 7

First Carbonatable Waste: 5 g Air Pollution Control Residue
Second Carbonatable Waste: 5 g Cement Bypass Dust
Carbonatable Binder: NONE
Carbonation Time: 10 mins
Strength: 3.377 MPa

Example 8

First Carbonatable Waste: 5 g Air Pollution Control Residue
Second Carbonatable Waste: NONE
Carbonatable Binder: 5 g Portland Cement
Carbonation Time: 10 mins
Strength: 1.857 MPa

Example 9

First Carbonatable Waste: Air Pollution Control Residue
Second Carbonatable Waste: Pulverised Fuel Ash
Carbonatable Binder: Portland Cement
Carbonation Time: 10 mins
Strength: 2.877 MPa

Example 10

First Carbonatable Waste: 25% Cement Bypass Dust
Second Carbonatable Waste: 25% Pulverised Fuel Ash
Carbonatable Binder: 50% Portland Cement
Carbonation Time: 10 mins
Strength: 5.048 MPa

Example 11

First Carbonatable Waste: Biomass Ash
Second Carbonatable Waste: Pulverised Fuel Ash
Carbonatable Binder: Portland Cement
Carbonation Time: 10 mins
Strength: 3.509 MPa

Example 12

First Carbonatable Waste: 5 g Air Pollution Control Residue
Second Carbonatable Waste: 5 g Biomass Ash
Carbonatable Binder: NONE
Carbonation Time: 20 mins
Strength: 2.001 MPa

Example 13

First Carbonatable Waste: 5 g Cement Bypass Dust
Second Carbonatable Waste: 5 g Biomass Ash
Carbonatable Binder: NONE
Carbonation Time: 20 mins
Strength: 1.984 MPa

Example 14

First Carbonatable Waste: 5 g Biomass Ash
Second Carbonatable Waste: NONE
Carbonatable Binder: 5 g Portland Cement
Carbonation Time: 20 mins
Strength: 2.942 MPa

Example 15

First Carbonatable Waste: 5 g Cement Bypass Dust
Second Carbonatable Waste: NONE
Carbonatable Binder: 5 g Portland Cement
Carbonation Time: 20 mins
Strength: 8.213 MPa

Example 16

First Carbonatable Waste: 2.5 g Cement Bypass Dust
Second Carbonatable Waste: 2.5 g Biomass Ash
Carbonatable Binder: 5 g Portland Cement
Carbonation Time: 20 mins
Strength: 5.424 MPa

Example 17

First Carbonatable Waste: 2.5 g Pulverised Fuel Ash
Second Carbonatable Waste: 2.5 g Steel Slag
Carbonatable Binder: 5 g Portland Cement
Carbonation Time: 20 mins
Strength: 7.483 MPa

Example 18

First Carbonatable Waste: 5 g Air Pollution Control Residue
Second Carbonatable Waste: 5 g Cement Bypass Dust
Carbonatable Binder: NONE
Carbonation Time: 20 mins
Strength: 4.371 MPa

Example 19

First Carbonatable Waste: 5 g Air Pollution Control Residue
Second Carbonatable Waste: NONE
Carbonatable Binder: 5 g Portland Cement
Carbonation Time: 20 mins
Strength: 2.580 MPa

Example 20

First Carbonatable Waste: Air Pollution Control Residue
Second Carbonatable Waste: Pulverised Fuel Ash
Carbonatable Binder: Portland Cement
Carbonation Time: 20 mins
Strength: 4.561 MPa

Example 21

First Carbonatable Waste: 25% Cement Bypass Dust
Second Carbonatable Waste: 25% Pulverised Fuel Ash
Carbonatable Binder: 50% Portland Cement
Carbonation Time: 20 mins
Strength: 6.480 MPa

Example 22

First Carbonatable Waste: Biomass Ash
Second Carbonatable Waste: Pulverised Fuel Ash
Carbonatable Binder: Portland Cement
Carbonation Time: 20 mins
Strength: 5.110 MPa

The invention claimed is:
1. A process for the preparation of aggregates, the process comprising the steps of:
   a. blending air pollution control residue with a carbonatable substance;

b. mixing the blended air pollution control residue and carbonatable substance with water to form a damp blended air pollution control residue and carbonatable substance mixture; and c. carbonating the damp blended air pollution control residue and carbonatable substance mixture in the presence of carbon dioxide, wherein:

the carbonatable substance is cement bypass dust, pulverised fuel ash, or ordinary Portland cement, or a mixture thereof, a weight ratio between the air pollution control residue and the carbonatable substance is approximately 1:2 to approximately 2:1, and the aggregate comprises particles having a compressive strength of from about 4.371 MPa to about 4.561 MPa with a carbonation time of 20 minutes.

2. A process according to claim 1, further comprising the step of initially sieving the air pollution control residue and/or the carbonatable substance before blending and optionally wherein the air pollution control residue and/or the carbonatable substance are initially sieved to obtain a particle size of less than around 0.1 mm before blending.

3. A process according to claim 1, wherein the blended air pollution control residue and carbonatable substance is mixed with around 15-30% w/w of water to form the damp blended air pollution control residue and carbonatable substance mixture and optionally the process further comprising the step of mixing the damp blended air pollution control residue and carbonatable substance mixture and/or further comprising the step of sieving the damp blended air pollution control residue and carbonatable substance mixture.

4. A process according to claim 1, wherein the carbonatable substance is cement bypass dust and the compressive strength is about 4.371 MPa with the carbonation time of 20 minutes.

5. A process according to claim 1, wherein the carbonatable substance is pulverised fuel ash and the compressive strength is about 4.561 MPa with the carbonation time of 20 minutes.

6. A process according to claim 1, wherein the weight ratio between the air pollution control residue and the carbonatable substance is approximately 1:1.

7. A process according to claim 1, wherein the damp blended air pollution control residue and carbonatable substance mixture consists of the damp blended air pollution control residue and carbonatable substance without an added carbonatable binder.

8. A process according to claim 1, wherein the damp blended air pollution control residue and carbonatable substance mixture consists of the damp blended air pollution control residue and carbonatable substance without added cement kiln dust or ordinary Portland cement.

* * * * *